US011039500B2

(12) United States Patent
Tränk et al.

(10) Patent No.: US 11,039,500 B2
(45) Date of Patent: Jun. 15, 2021

(54) RESOURCE ALLOCATION FOR GROUP COMMUNICATION IN A NETWORK

(71) Applicant: Telefonaktiebolaget LM Ericsson (publ), Stockholm (SE)

(72) Inventors: Magnus Tränk, Lerum (SE); Mikael Persson, Nödinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 10 days.

(21) Appl. No.: 16/615,428

(22) PCT Filed: Jun. 19, 2018

(86) PCT No.: PCT/EP2018/066218
§ 371 (c)(1),
(2) Date: Nov. 21, 2019

(87) PCT Pub. No.: WO2018/234292
PCT Pub. Date: Dec. 27, 2018

(65) Prior Publication Data
US 2020/0178345 A1 Jun. 4, 2020

Related U.S. Application Data

(60) Provisional application No. 62/522,454, filed on Jun. 20, 2017.

(51) Int. Cl.
*H04W 76/00* (2018.01)
*H04W 76/45* (2018.01)
(Continued)

(52) U.S. Cl.
CPC ........... *H04W 76/45* (2018.02); *H04M 15/66* (2013.01); *H04W 4/10* (2013.01); *H04W 80/10* (2013.01)

(58) Field of Classification Search
CPC ....... H04W 76/45; H04W 4/10; H04W 80/10; H04M 15/66
See application file for complete search history.

(56) References Cited

U.S. PATENT DOCUMENTS 8,559,610 B2 * 10/2013 Crockett ............... H04W 4/021
379/202.01
8,995,436 B2 3/2015 Kong et al.
(Continued)

FOREIGN PATENT DOCUMENTS

| GB | 2558322 A | 7/2018 |
|---|---|---|
| KR | 20160013904 A | 2/2016 |
| KR | 101709788 B1 | 2/2017 |

OTHER PUBLICATIONS

3rd Generation Partnership Project, "3rd Generation Partnership Project; Technical Specification Group Services and System Aspects; Common Functional Architecture to Support Mission Critical Services; Stage 2 (Release 14)", Technical Specification, 3GPP TS 23.280 V14.1.0, Mar. 1, 2017, pp. 1-141, 3GPP.

*Primary Examiner* — Khai M Nguyen
(74) *Attorney, Agent, or Firm* — Coats + Bennett, PLLC

(57) ABSTRACT

There is provided mechanisms for resource allocation for group communication in a network. A method is performed by a server node of the group communication. The method comprises receiving a first request from a client node for the client node to affiliate with a group of client nodes in order for the client node to join a group communication session of the group communication system. The method comprises requesting, from a core network node and in response to the first request, a first allocation of network resources to be used by the client node for transmission control of the group communication session. The method comprises receiving a second request for a group call from the client node. The method comprises requesting, from the core network node
(Continued)

and upon reception of the second request, a second allocation of network resources to be used by the client node for media transmission in the group call.

18 Claims, 5 Drawing Sheets

(51) Int. Cl.
*H04M 15/00* (2006.01)
*H04W 4/10* (2009.01)
*H04W 80/10* (2009.01)

(56) References Cited

U.S. PATENT DOCUMENTS

| | | | |
|---|---|---|---|
| 9,432,820 B2 | 8/2016 | Anchan et al. | |
| 2008/0032729 A1 | 2/2008 | Luo | |
| 2009/0280849 A1* | 11/2009 | Rosen | H04L 47/822 |
| | | | 455/518 |
| 2013/0315164 A1* | 11/2013 | Arur | H04W 4/10 |
| | | | 370/329 |
| 2015/0057040 A1* | 2/2015 | Kuehner | H04W 84/08 |
| | | | 455/509 |
| 2015/0229677 A1* | 8/2015 | Gu | H04L 65/103 |
| | | | 709/219 |
| 2016/0205519 A1 | 7/2016 | Patel et al. | |
| 2016/0381528 A1* | 12/2016 | Lee | H04W 76/45 |
| | | | 455/404.1 |
| 2017/0086033 A1* | 3/2017 | kesson | H04W 4/10 |

* cited by examiner

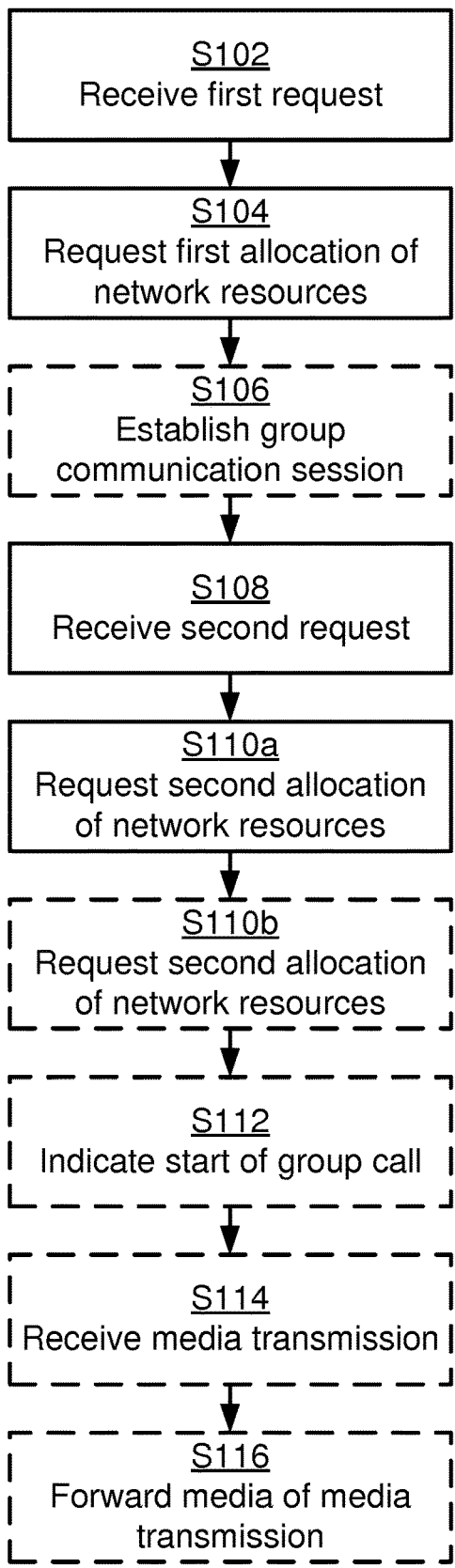
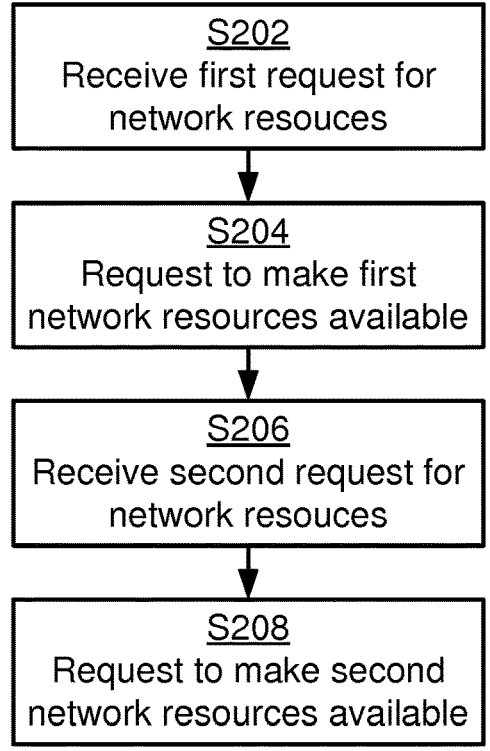
Fig. 3
Fig. 4

RESOURCE ALLOCATION FOR GROUP COMMUNICATION IN A NETWORK

TECHNICAL FIELD

Embodiments presented herein relate to methods, a server node, a core network node, computer programs, and a computer program product for resource allocation for group communication in a network.

BACKGROUND

In communications networks, there may be a challenge to obtain good performance and capacity for a given communications protocol, its parameters and the physical environment in which the communications network is deployed.

For example, so-called Mission Critical (MC) communication services (hereinafter MC service for short) could be essential for the work performed by public safety users, e.g. ambulance services, police force and fire brigade. MC services require preferential handling compared to normal telecommunication services, including prioritized handling of MC calls for emergency and imminent threats. One commonly used communication mechanism for public safety users is Group Communication (GC). Group Communication generally requires that the same information is delivered to multiple users. One type of Group Communication is Push to Talk (PTT) services.

A PTT call typically starts with that one user requests the right to transmit and a PTT control node grants this request. The media of the call (such as audio, video, text, images, etc.) is then transmitted from one user to multiple PTT users. These PTT users may be located at different locations. If many users are located within the same area, multicast or broadcast based transmission using e.g. Multicast-Broadcast Multimedia Services (MBMS) in a third generation partnership project (3GPP) network enabled for MBMS is efficient. MBMS is a unidirectional transmission technology. One advantage of using MBMS is that the number of users does not impact the performance that much. In a PTT call over MBMS, voice data is transmitted to, and reached by, all users at the same time, which also means that all users get the same mouth-to-ear delay experience.

In a Group Communication (GC) service such as PTT, one commonly used protocol is the Session Initiation Protocol (SIP). The SIP protocol initiates and establishes communication sessions used by the service. During the SIP session establishment, session parameters e.g. media parameters, codecs, Internet Protocol (IP) address and port numbers, are negotiated. In a 3GPP based telecommunications system, the network resources to be used for the service are requested at the SIP session establishment.

The SIP protocol is transferred with the Transmission Control Protocol (TCP) and requires bi-directional transmission, which means that unicast transmission must be used. Thus, MBMS cannot be used for session establishment but only after session establishment.

There are strict and challenging performance requirements related to group communication, and specifically to PTT services. One example of such a key performance indicator (KPI) is the mouth-to-ear delay requirement. This KPI is usually defined as the time from that a user's voice is recorded by the microphone of the transmitting device to the time when the same voice is played out in the speaker of the receiving devices.

To establish a SIP session for a PTT group call with many users is a time consuming procedure. The consequence of this is that it is difficult to reach the KPIs for call setup and mouth-to-ear. Hence, there is still a need for an improved session establishment procedure for group communication sessions to be able to meet the performance requirements for group communication, such as PTT.

SUMMARY

An object of embodiments herein is to provide mechanisms for efficient resource allocation for group communication in a network.

According to a first aspect there is presented a method for resource allocation for group communication in a network. The method is performed by a server node of the group communication system. The method comprises receiving a first request from a client node for the client node to affiliate with a group of client nodes in order for the client node to join a group communication session of the group communication system. The method comprises requesting, from a core network node and in response to the first request, a first allocation of network resources to be used by the client node for transmission control of the group communication session. The method comprises receiving a second request for a group call from the client node. The method comprises requesting, from the core network node and upon reception of the second request, a second allocation of network resources to be used by the client node for media transmission in the group call.

According to a second aspect there is presented a server node for resource allocation for group communication in a network. The server node comprises processing circuitry. The processing circuitry is configured to cause the server node to receive a first request from a client node for the client node to affiliate with a group of client nodes in order for the client node to join a group communication session of the group communication system. The processing circuitry is configured to cause the server node to request, from a core network node and in response to the first request, a first allocation of network resources to be used by the client node for transmission control of the group communication session. The processing circuitry is configured to cause the server node to receive a second request for a group call from the client node. The processing circuitry is configured to cause the server node to request, from the core network node and upon reception of the second request, a second allocation of network resources to be used by the client node for media transmission in the group call.

According to a third aspect there is presented a server node for resource allocation for group communication in a network. The server node comprises processing circuitry and a storage medium. The storage medium stores instructions that, when executed by the processing circuitry, cause the server node to perform operations, or steps. The operations, or steps, cause the server node to receive a first request from a client node for the client node to affiliate with a group of client nodes in order for the client node to join a group communication session of the group communication system. The operations, or steps, cause the server node to request, from a core network node and in response to the first request, a first allocation of network resources to be used by the client node for transmission control of the group communication session. The operations, or steps, cause the server node to receive a second request for a group call from the client node. The operations, or steps, cause the server node to request, from the core network node and upon reception of the second request, a second allocation of network resources to be used by the client node for media transmission in the group call.

According to a fourth aspect there is presented a server node for resource allocation for group communication in a network. The server node comprises a receive module configured to receive a first request from a client node for the client node to affiliate with a group of client nodes in order for the client node to join a group communication session of the group communication system. The server node comprises a request module configured to request, from a core network node and in response to the first request, a first allocation of network resources to be used by the client node for transmission control of the group communication session. The server node comprises a receive module configured to receive a second request for a group call from the client node. The server node comprises a request module configured to request, from the core network node and upon reception of the second request, a second allocation of network resources to be used by the client node for media transmission in the group call.

According to a fifth aspect there is presented a computer program for resource allocation for group communication in a network. The computer program comprises computer program code which, when run on processing circuitry of a server node, causes the server node to perform a method according to the first aspect.

According to a sixth aspect there is presented a method for resource allocation for group communication in a network. The method is performed by a core network node. The method comprises receiving, from a server node of a group communication system, a first request for first network resources to be used by a client node of a group communication session of the group communication for transmission control of the group communication session. The method comprises requesting a radio access network of the client node to make the first network resources available to the client node. The method comprises receiving, from the server node, a second request for second network resources to be used by the client node for media transmission in the group call. The method comprises requesting the radio access network of the client node to make the second network resources available to the client node. The first request and the second request are received during one and the same SIP session or SAP session.

According to a seventh aspect there is presented a core network node for resource allocation for group communication in a network. The core network node comprises processing circuitry. The processing circuitry is configured to cause the core network node to receive, from a server node of a group communication system, a first request for first network resources to be used by a client node of a group communication session of the group communication for transmission control of the group communication session. The processing circuitry is configured to cause the core network node to request a radio access network of the client node to make the first network resources available to the client node. The processing circuitry is configured to cause the core network node to receive, from the server node, a second request for second network resources to be used by the client node for media transmission in the group call. The processing circuitry is configured to cause the core network node to request the radio access network of the client node to make the second network resources available to the client node. The first request and the second request are received during one and the same SIP session or SAP session.

According to an eighth aspect there is presented a core network node for resource allocation for group communication in a network. The core network node comprises processing circuitry and a storage medium. The storage medium stores instructions that, when executed by the processing circuitry, cause the core network node to perform operations, or steps. The operations, or steps, cause the core network node to receive, from a server node of a group communication system, a first request for first network resources to be used by a client node of a group communication session of the group communication system for transmission control of the group communication session. The operations, or steps, cause the core network node to request a radio access network of the client node to make the first network resources available to the client node. The operations, or steps, cause the core network node to receive, from the server node, a second request for second network resources to be used by the client node for media transmission in the group call. The operations, or steps, cause the core network node to request the radio access network of the client node to make the second network resources available to the client node. The first request and the second request are received during one and the same SIP session or SAP session.

According to a ninth aspect there is presented a core network node for resource allocation for group communication in a network. The core network node comprises a receive module configured to receive, from a server node of the group communication system, a first request for first network resources to be used by a client node of a group communication session of the group communication system for transmission control of the group communication session. The core network node comprises a request module configured to request a radio access network of the client node to make the first network resources available to the client node. The core network node comprises a receive module configured to receive, from the server node, a second request for second network resources to be used by the client node for media transmission in the group call. The core network node comprises a request module configured to request the radio access network of the client node to make the second network resources available to the client node. The first request and the second request are received during one and the same SIP session or SAP session.

According to a tenth aspect there is presented a computer program for resource allocation for group communication in a network, the computer program comprising computer program code which, when run on processing circuitry of a core network node, causes the core network node to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium could be a non-transitory computer readable storage medium.

Advantageously these methods, these server nodes, these core network nodes, and these computer programs provide efficient resource allocation for group communication in a network. This in turn provides an efficient session establishment procedure for group communication sessions that meets the performance requirements for group communication system, such as PTT.

Advantageously these methods, these server nodes, these core network nodes, and these computer programs enable network resources for media transmission are only allocated when needed, i.e. when the group call starts. This allows SIP sessions to be established long time before the group call starts, which could be beneficial from a performance perspective.

Advantageously these methods, these server nodes, these core network nodes, and these computer programs enable mouth-to-ear delay requirements to be met also for group calls with many users using unicast (bi-directional) transmission.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIGS. 3 and 4 are flowcharts of methods according to embodiments;

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
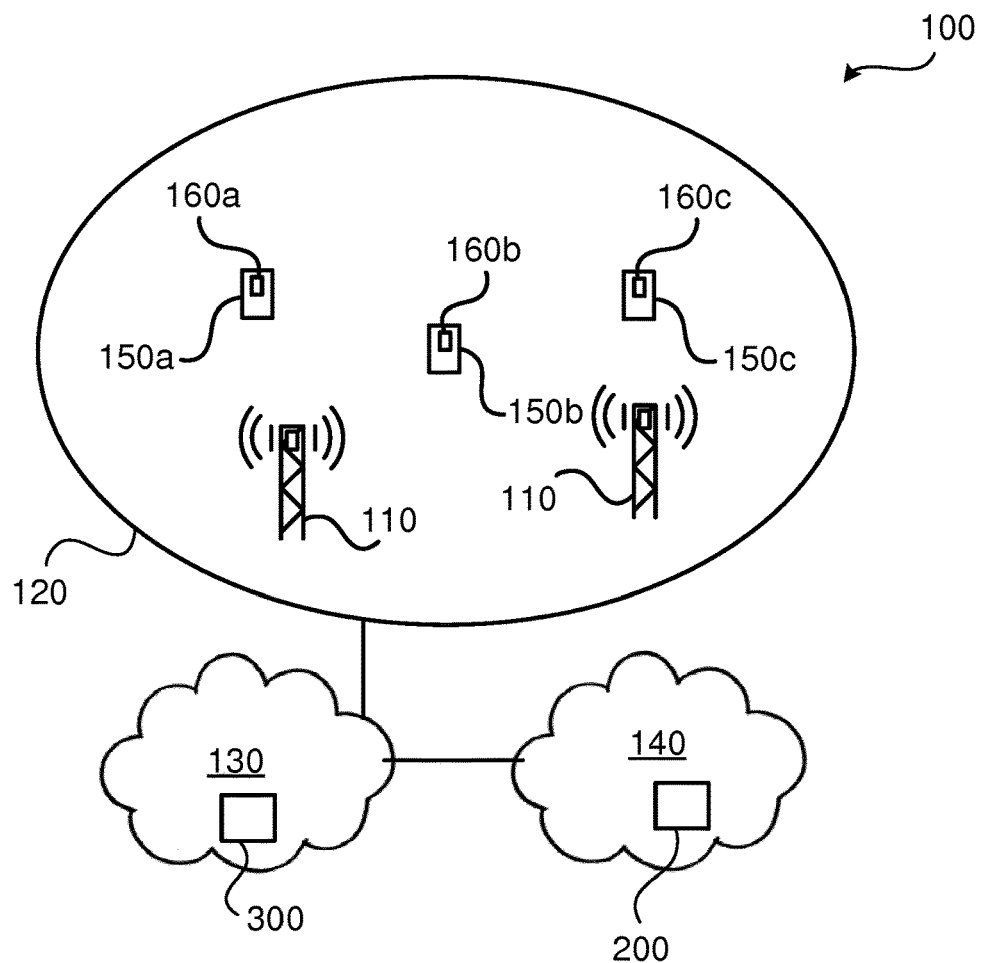
FIG. 1 is a schematic diagram illustrating a communications network according to embodiments.

FIG. 1 is a schematic diagram illustrating a communications network 100 where embodiments presented herein can be applied. The communications network 100 may be regarded as a wireless communications network. The wireless communications network provides services to client nodes 160a, 160b, 160c. Each client node 160a, 160b, 160c may be provided in, or installed on, a respective wireless device 150a, 150b, 150c.

The communications network 100 comprises a radio access network 120, a core network 130 comprising a core network node 300, and a service network 140 comprising a server node 200. The server node 200 could implement the functionality of a group communication server node (GC server node) or an MC service server.

The radio access network 120 is operatively connected to the core network 130 which in turn is operatively connected to the service network 140. Radio access network nodes 110 in the radio access network 120 thereby enable the wireless devices 150a, 150b, 150c, and hence the client nodes 160a, 160b, 160c, to access services and exchange data as provided by the service network 140. Particularly, the client nodes 160a, 160b, 160c are thereby enabled to communicate with the server node 200.

Examples of wireless devices 150a, 150b, 150c include, but are not limited to, mobile stations, mobile phones, handsets, wireless local loop phones, user equipment (UE), smartphones, laptop computers, and tablet computers. Examples of radio access network nodes 110 include, but are not limited to, radio base stations, base transceiver stations, node Bs, evolved node Bs, gigabit node Bs, and access points. As the skilled person understands, the communications network 100 may comprise a plurality of radio access network nodes 110, each providing network access to a plurality of wireless devices 150a, 150b, 150c. The herein disclosed embodiments are not limited to any particular number of radio access network nodes 110, client nodes 160a, 160b, 160c, or wireless devices 150a, 150b, 150c.

The nodes indicated herein may be seen as functions, where each function may be implemented in one or more physical entities. Further, a step, action, or similar that is performed by a client node 160a, 160b, 160c is, in some aspects, also performed by the wireless device 150a, 150b, 150c in which the client node 160a, 160b, 160c is provided.

As disclosed above, setting up SIP sessions and allocating resources takes too long time in group communications, such as group calls, when many client nodes 160a, 160b, 160c are involved. The KPIs for group communication is thus challenging to meet with large groups of client nodes 160a, 160b, 160c.

SIP sessions could be pre-established prior a group call. However, when pre-establishing SIP sessions in a 3GPP based telecommunications network it will also require that the network resources are allocated at the same time, which might result in a waste of network resources if the group call does not start soon after the SIP session has been established.

Figure 2:
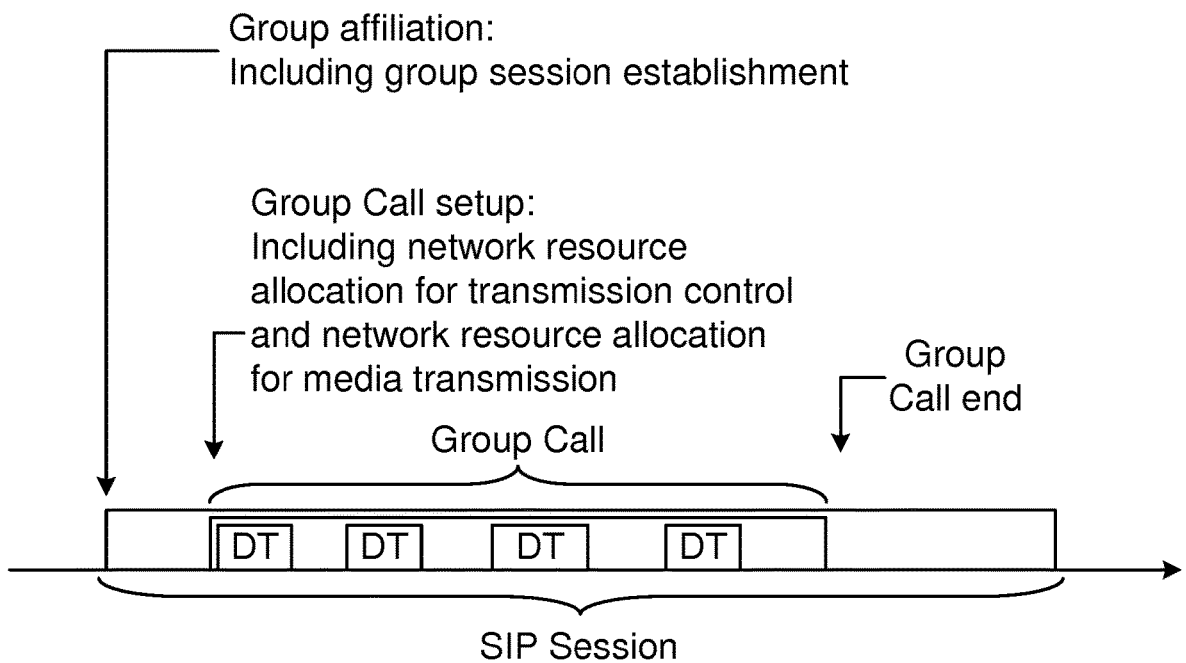
FIG. 2 is a schematic illustration of a SIP session for a group call according to state of the art.

FIG. 2 schematically illustrates a SIP session for a group call. "DT" is short for data transmission. As illustrated in FIG. 2, a client node affiliates with a group in order to participate in the group communication (which means that the client node is allowed to transmit or receive data in the group). All network resources required for the group call are allocated when the group call starts (at the group call setup) and released at group call end.

To start a group call using the SIP protocol is time consuming. For large groups of client nodes it is challenging to reach acceptable KPIs if the group communication session is started at the group call setup. The group communication session may also be started at the group affiliation. However, this gives the disadvantage that the network resources are allocated even if there is not any ongoing group call.

The embodiments disclosed herein thus relate to mechanisms for resource allocation for group communication in a network 100. In order to obtain such mechanisms there is provided a server node 200, a method performed by the server node 200, a computer program product comprising code, for example in the form of a computer program, that when run on processing circuitry of the server node 200, causes the server node 200 to perform the method. In order to obtain such mechanisms there is further provided a core network node 300, a method performed by the core network node 300, and a computer program product comprising code, for example in the form of a computer program, that when run on processing circuitry of the core network node 300, causes the core network node 300 to perform the method.

FIG. 3 is a flowchart illustrating embodiments of methods for resource allocation for group communication in a network 100 as performed by the server node 200. FIG. 4 is a flowchart illustrating embodiments of methods for resource allocation for group communication in a network 100 as performed by the core network node 300. The methods are advantageously provided as computer programs 1120a, 1120b.

Reference is now made to FIG. 3 illustrating a method for resource allocation for group communication in a network 100 as performed by the server node 200 of the group communication system according to an embodiment.

It is assumed that client node 160a wishes to affiliate with a group of client nodes and therefore sends a request relating thereto to the server node 200. The server node 200 is assumed to receive this request. Particularly, the server node 200 is configured to perform step S102:

S102: The server node 200 receives a first request from the client node 160a. The first request is for the client node 160a to affiliate with a group of client nodes 160b, 160c. This is in order for the client node 160a to join a group communication session of the group communication system.

The server node 200 responds to the first request by requesting network resources to be used by the client node 160a. However, in order to save network resources, network resources for media transmission are not requested at this time. Particularly, the server node 200 is configured to perform step S104:

S104: The server node 200 requests, from the core network node 300 and in response to the first request, a first allocation of network resources. These network resources are to be used by the client node 160a for transmission control of the group communication session.

The request in step S104 is thus made without requesting any network resources to be used by the client node 160a for media transmission in the group communication session. Thus, in some aspects only network resources to be used for transmission control of the group communication session are requested.

It is assumed then that client node 160a intends to make a group call in the group communication session and therefore sends a request relating thereto to the server node 200.

The server node 200 is assumed to receive this request. Particularly, the server node 200 is configured to perform step S108:

S108: The server node 200 receives a second request from the client node 160a. This second request is for a group call. The group call is thus to be made by the client node 160a.

Since network resources for media transmission were not requested in step S104 the server node 200 responds to the second request by, in turn, requesting further network resources to be used by the client node 160a. Particularly, the server node 200 is configured to perform step S110a:

S110a: The server node 200 requests, from the core network node 300 and upon reception of the second request, a second allocation of network resources. These network resources are to be used by the client node 160a for media transmission in the group call.

The server node 200 thus provides separate requests for the network resources to be used by the client node 160a for transmission control of the group communication session and for the network resources to be used by the client node 160a for media transmission in the group call. The request for the network resources to be used by the client node 160a for transmission control of the group communication session is made upon receiving a request for the client node 160a to affiliate with a group of client nodes 160b, 160c whereas the request for the network resources to be used by the client node 160a for media transmission in the group call is delayed until receiving a request from the client node 160a for a group call.

Advantageously the method of steps S102, S104, S108, S110a provides efficient resource allocation for group communication in the network 100. This in turn provides an efficient session establishment procedure for group communication sessions that meets the performance requirements for group communication, such as PTT.

Advantageously the method of steps S102, S104, S108, S110a enables network resources for media transmission only to be allocated when needed, i.e. when the group call starts. This allows SIP sessions or SAP sessions to be established long time before the group call starts, which could be beneficial from a performance perspective.

Advantageously the method of steps S102, S104, S108, S110a enables mouth-to-ear delay requirements to be met also for group calls with many users using unicast (bi-directional) transmission.

Embodiments relating to further details of resource allocation for group communication in a network 100 as performed by the server node 200 will now be disclosed.

In some aspects the network resources requested in step S104 and step S110a are to be used for the same SIP session or Session Announcement Protocol (SAP) session. Particularly, according to an embodiment the network resources to be used by the client node 160a for transmission control of the group communication session and the network resources to be used by the client node 160a for media transmission in the group call are to be used in one and the same SIP session or SAP session.

In some aspects a new SIP session or SAP session is set up in response to the group affiliation in step S102. In particular, according to an embodiment the first request causes establishment of the SIP session or SAP session between the client node 160a and the server node 200.

In other aspects the SIP session or SAP session is ongoing. In particular, according to an embodiment the SIP session or SAP session is ongoing when the first request is received.

The first request then causes the client node 160a to affiliate to the group of client nodes 160b, 160c in the SIP session or SAP session.

There could be different purposes pf the transmission control. In some aspects the transmission control is for a PTT service in the group communication session. Particularly, according to an embodiment the transmission control comprises floor control in a PTT call of the group communication session.

There could be different types of requests made in step S104 in order to specify that the network resources are to be used for transmission control. According to some aspects the server node 200 specifies the media type for the network resources as control. Particularly, according to an embodiment, requesting the first allocation involves the server node 200 to transmit a message indicating media type as control to the core network node 300.

In some aspects the group communication session is established once having requested (and obtained) the first allocation of network resources in step S104. Hence, according to an embodiment the server node 200 is configured to perform (optional) step S106:

S106: The server node 200 establishes the group communication session with the client node 160a. The group communication session is established when having requested the first allocation (as in step S104) but before having requested the second allocation (as in step S108). This enables the client node 160a to join the group communication session.

In some aspects the client node 160a uses the first allocated network resources when making the second request. Thus, according to an embodiment the second request is transmitted by the client node 160a using network resources according to the first allocation.

In some aspects the client node 160a in the second request requests the right to transmit media in the group call (where the client node 160a thus requests floor control). Particularly, according to an embodiment the second request comprises a request for the client node 160a to transmit media in the group call.

There could be different types of requests made in step S110a in order to specify that the network resources are to be used for media transmission. According to some aspects the server node 200 specifies the media type for the network resources as audio or video. Particularly, according to an embodiment, requesting the second allocation involves the server node 200 to transmit a message indicating media type as audio or video to the core network node 300.

In some aspects at least one further client node 160b, 160c has also affiliated with a group of client nodes and have had network resources allocated to be used by the further client nodes 160b, 160c for transmission control of the group communication session. Thus steps S102, S104, S108 (and optionally, step S106) have also been performed for these further client nodes 160b, 160c. Therefore, network resources to be used by these further client nodes 160b, 160c for media transmission in the group call could also be requested when receiving the request in step S108 for a group call from the client node 160a. Particularly, according to an embodiment the server node 200 is configured to perform (optional) step S110b:

S110b: The server node 200 requests, from the core network node 300 and upon reception of the second request, a respective second allocation of network resources. These network resources are to be used by each client node 160b, 160c in the group of client nodes for media transmission in the group call.

If MBMS is used there is no need for network resource allocation for client nodes 160b and 160c in the uplink. Hence, step S110b is not required for the client nodes 160b and 160c to be able to receive media transmission when using MBMS. That is, according to an embodiment the media transmission in downlink is using MBMS bearers, and only uplink network resources to be used by each client node 160b, 160c are requested in step S110b.

As disclosed above, the second request received in step S108 is for a group call where the group call is to be made by the client node 160a. In some aspects this marks the start of the group call (once the network resources requested in step S110a have been granted). Particularly, according to an embodiment the server node 200 is configured to perform (optional) step S112:

S112: The server node 200 indicates, to all client nodes 160a, 160b, 160c, start of the group call when having requested the second allocation.

Once the group call has been started any of the client nodes 160a, 160b, 160c could transmit media in the group call. In some aspects the client node 160a has requested floor control and thus intends to transmit media. Particularly, according to an embodiment the server node 200 is configured to perform (optional) step S114:

S114: The server node 200 receives media transmission for the group call from the client node 160a.

The media transmission is transmitted by the client node 160a using network resources according to the second allocation. The server node 200 then forwards this media to the remaining client nodes 160b, 160c in the group call. Particularly, according to an embodiment the server node 200 is configured to perform (optional) step S116:

S116: The server node 200 forwards media of the media transmission to other client nodes 160b, 160c in the group of client nodes.

Reference is now made to FIG. 4 illustrating a method for resource allocation for group communication in a network 100 as performed by the core network node 300 according to an embodiment.

As disclosed above, the server node 200 in step S104 requests, from the core network node 300, a first allocation of network resources. Hence, the core network node 300 is configured to perform step S202:

S202: The core network node 300 receives, from the server node 200 of the group communication system, a first request. The first request is for first network resources to be used by client node 160a of a group communication session of the group communication system. The first network resources are to be used by client node 160a for transmission control of the group communication session.

The network resources are to be made available in the radio access network 110 and the core network node 300 therefore requests the necessary network resources from the radio access network 110. Hence, the core network node 300 is configured to perform step S204:

S204: The core network node 300 requests a radio access network of the client node 160a to make the first network resources available to the client node 160a.

As further disclosed above, the server node 200 in step S110a requests, from the core network node 300, a second allocation of network resources. Hence, the core network node 300 is configured to perform step S206:

S206: The core network node 300 receives, from the server node 200, a second request for second network resources. The second network resources are to be used by the client node 160a for media transmission in the group call.

Also these network resources are to be made available in the radio access network 110 and the core network node 300 therefore requests the necessary network resources from the radio access network 110. Hence, the core network node 300 is configured to perform step S208:

S208: The core network node 300 requests the radio access network of the client node 160*a* to make the second network resources available to the client node 160*a*.

The first request and the second request are received during one and the same SIP session or SAP session.

Embodiments relating to further details of resource allocation for group communication in a network 100 as performed by the core network node 300 will now be disclosed.

As disclosed, according to some aspects the server node 200 in step S104 specifies the media type for the network resources as control. Thus, according to an embodiment the first request for network resources (as received in step S202) comprises a message indicating media type as control. The core network node 300 could use this information, i.e. that the media type is control, to determine the necessary amount of network resources to request from the radio access network for the client node 160*a* in step S204.

As further disclosed, according to some aspects the server node 200 in step S110*a* specifies the media type for the network resources as audio or video. Thus, according to an embodiment the second request (as received in step S206) for network resources comprises a message indicating media type as audio or video. The core network node 300 could use this information, i.e. that the media type is audio or vide, to determine the amount of necessary network resources to request from the radio access network for the client node 160*a* in step S208.

There could be different types of core network nodes 300. According to an embodiment the core network node 300 is a Policy and Charging Rules Function (PCRF) node. As is known by the skilled person the PCRF node is designated to in real-time determine policy rules in a multimedia network.

There could be different examples of network resources. In general terms, the network resources relate to radio resources, i.e., resource to be used for transmission of data and control between the wireless devices of the client nodes and the radio access network nodes of the radio access network. In particular, according to an embodiment the network resources are radio resources in frequency and/or time domain, and/or transport resources in terms of transmission network capacity. Optionally, the network resources could relate to resources for transmission of data and control between the radio access network and the core network and/or between the core network and the service network.

Figure 5:
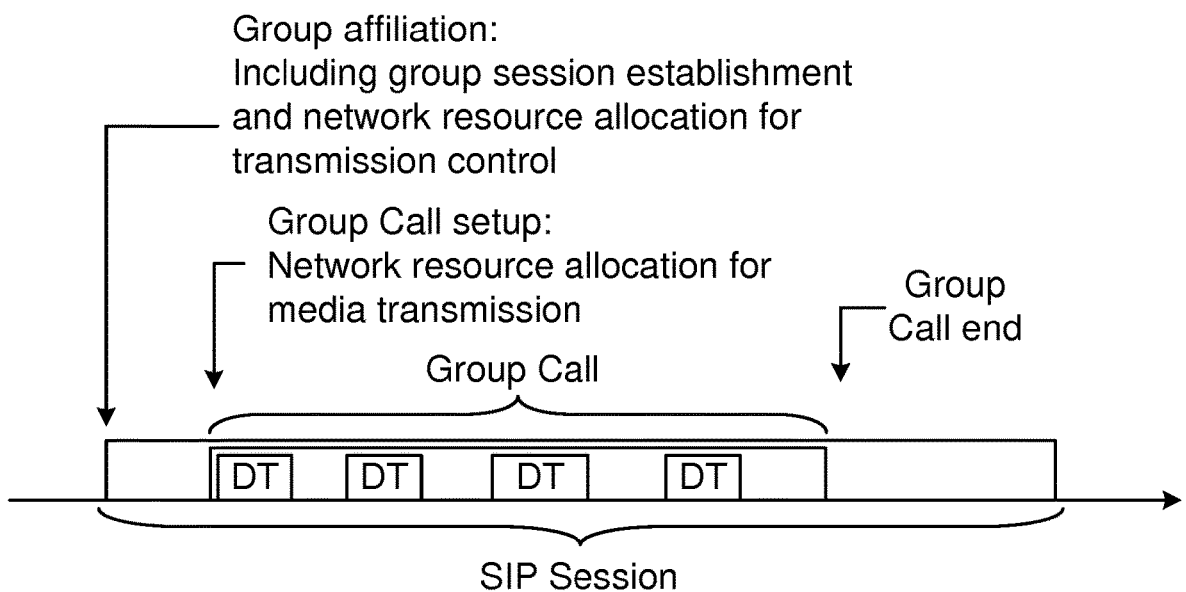
FIG. 5 is a schematic illustration of a SIP session for a group call according to an embodiment.

FIG. 5 schematically illustrates a SIP session for a group call according to an embodiment. "DT" is short for data transmission. In comparison to the SIP session for a group call illustrated in FIG. 2, according to the SIP session for a group call in FIG. 5 at group affiliation the group communication session is established and network resource are allocated for transmission control but not for the media transmission. The network resources for the media transmission are only allocated at the group call setup.

Figure 6:
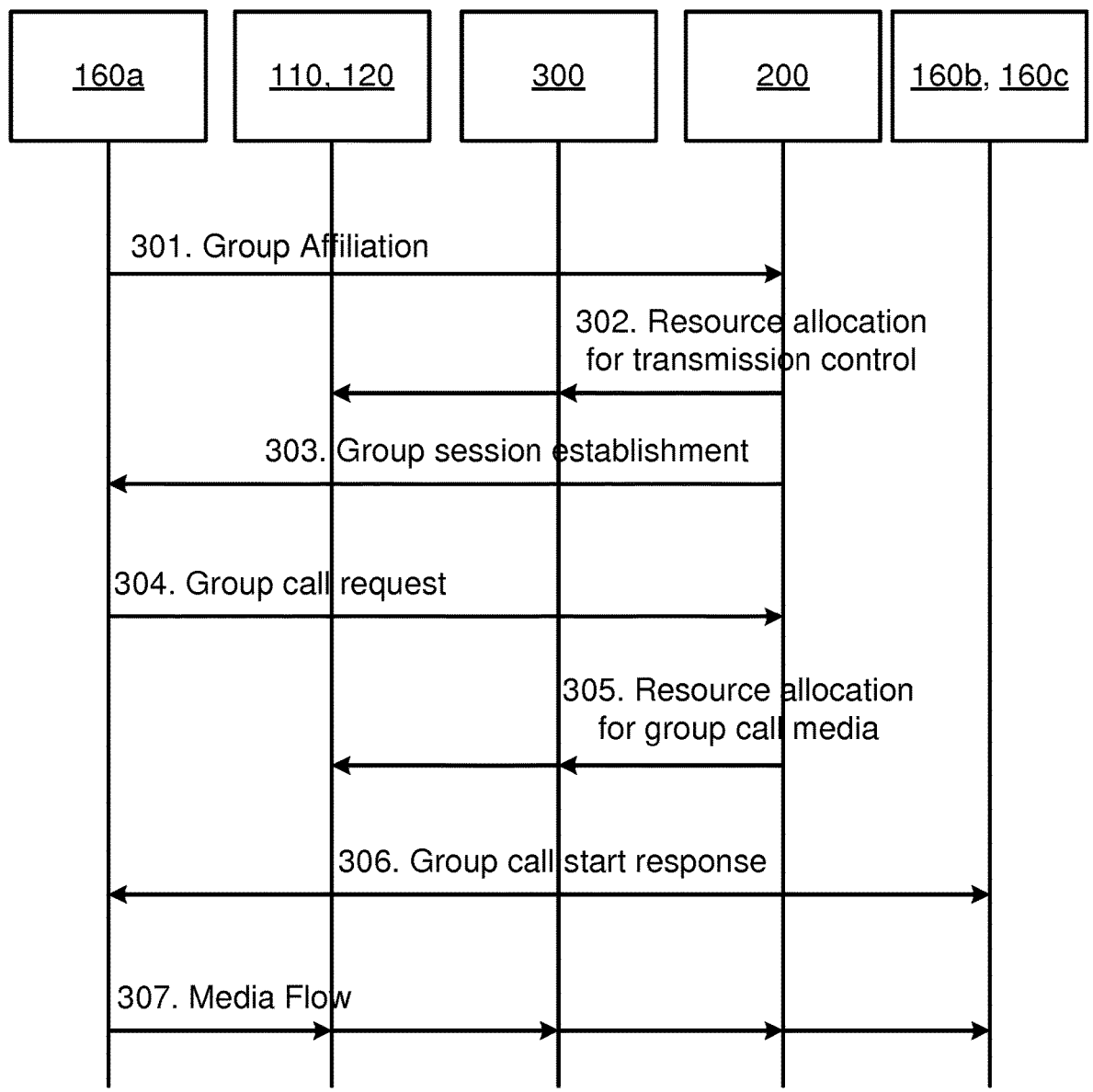
FIG. 6 is a signalling diagram according to an embodiment.

One particular embodiment for resource allocation for group communication in a network 100 based on at least some of the above disclosed embodiments will now be disclosed in detail with reference to the signalling diagram of FIG. 6. There might be several client nodes 160*a*, 160*b*, 160*c* involved in a group call. For clarity and ease of description, but without loss of generality, the signalling diagram in FIG. 6 only shows three such client nodes 160*a*, 160*b*, 160*c*.

S301: Client node 160*a* requests to affiliate with the group. The server node 200 thus receives a request from client node 160*a*. This implies that client node 160*a* intends to participate in any group communication related to the group. Once step S301 has been completed client node 160*a* will be able to transmit and/or receive media in the specific group. One way to implement step S301 is to perform step S102.

S302: The server node 200 allocates the required network resources for transmission control for the group communication session (such as floor control in a PTT system). One way to implement step S302 is to perform step S104 and steps S202, S204.

S303: The server node 200 and client node 160*a* sets up a group communication session. Setting up the group communication session comprises negotiation of media attributes for the group communication session, such as codecs to be used, Internet Protocol (IP) addresses, and ports. One way to implement step S303 is to perform step S106.

Furthermore, it is assumed that each client node 160*a*, 160*b*, 160*c* affiliates with the group and thus joins the group communication. It is thus assumed that separate occurrences of steps S301-S303 have been performed for client nodes 160*b*, 160*c* either before or after steps S301-S303 for client node 160*a*, but before below step S304. Steps S301, S302, S303 can be regarded as preparations steps and may occur a long time ahead of step S304.

S304: Client node 160*a* starts a group call by sending a group call request, which usually means that client node 160*a* also requests the right to transmit media data in the group call, thus requesting floor control. One way to implement step S304 is to perform step S108.

S305: The server node 200 allocates the required network resources for media transmission in the group call for client node 160*a* as well as for the rest client nodes 160*b*, 160*c* in the group call. One way to implement step S305 is to perform steps S110*a*, S110*b* and steps S206, S208.

S306: The server node 200 notifies all client nodes 160*a*, 160*b*, 160*c* that have affiliated with the group about the call start and may grant the right to transmit media to client node 160*a*. One way to implement step S306 is to perform step S112.

S307: Client node 160*a* transmits media to the server node 200. The server node 200 forwards the media to the remaining client nodes 160*b*, 160*c* in the group call. One way to implement step S307 is to perform steps S114, S116.

As is understood by the skilled person, at least some of the messages communicated between the server node 200 and the client nodes 160*a*, 160*b*, 160*c*, between the server node 200 and the core network node 300, and between the core network node 300 and the radio access network and that are related to requests are followed by acknowledgement messages once the request has been granted, that is once the requested network resources have been made available, or made accessible, for transmission control or data transmission. It is here thus assumed that the network resources as requested are granted and thus made available, or made accessible, for transmission control or data transmission for the client nodes 160*a*, 160*b*, 160*c*. However, in order not to obscure the inventive concept as described herein, the mentioning of such acknowledge messages, or the like, has been omitted.

Further, the terms group call and group communication session do not exclude that other types of media than voice is transmitted. Thus, the media transmission could include voice data or other types of audio data, text data, image data, video data, or any combination thereof.

In summary, according to at least some of the herein disclosed embodiments utilize the concept of pre-established sessions, which means that a SIP session or SAP session could be established long time before the actual group call starts. Furthermore, the radio access network is configured to only allocate resources needed to control the media transmission (that is, network resources are to be used by the client node 160a for transmission control, such as floor control messages, of the group communication session. The network resources needed for media transmission are allocated only once the group call starts, and thus not at SIP session or SAP session establishment. The network resources allocated for media transmission are thereby managed independently from the network resources allocated for transmission control.

Figure 7:
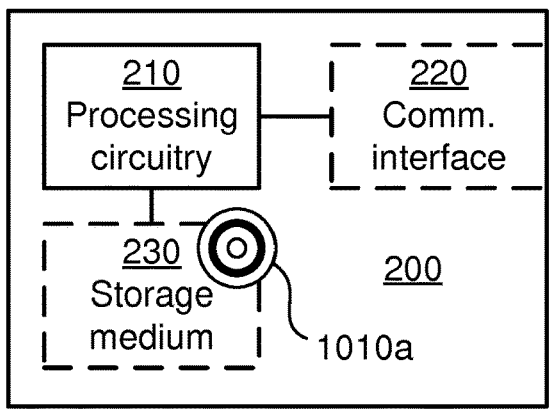
FIG. 7 is a schematic diagram showing functional units of a server node according to an embodiment.

FIG. 7 schematically illustrates, in terms of a number of functional units, the components of a server node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110a (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the server node 200 to perform a set of operations, or steps, S102-S116, as disclosed above. For example, the storage medium 230 may store the set of operations, and the processing circuitry 210 may be configured to retrieve the set of operations from the storage medium 230 to cause the server node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The server node 200 may further comprise a communications interface 220 for communications with other entities, nodes, functions, and devices in the network 100. As such the communications interface 220 may comprise one or more transmitters and receivers, comprising analogue and digital components.

The processing circuitry 210 controls the general operation of the server node 200 e.g. by sending data and control signals to the communications interface 220 and the storage medium 230, by receiving data and reports from the communications interface 220, and by retrieving data and instructions from the storage medium 230. Other components, as well as the related functionality, of the server node 200 are omitted in order not to obscure the concepts presented herein.

Figure 8:
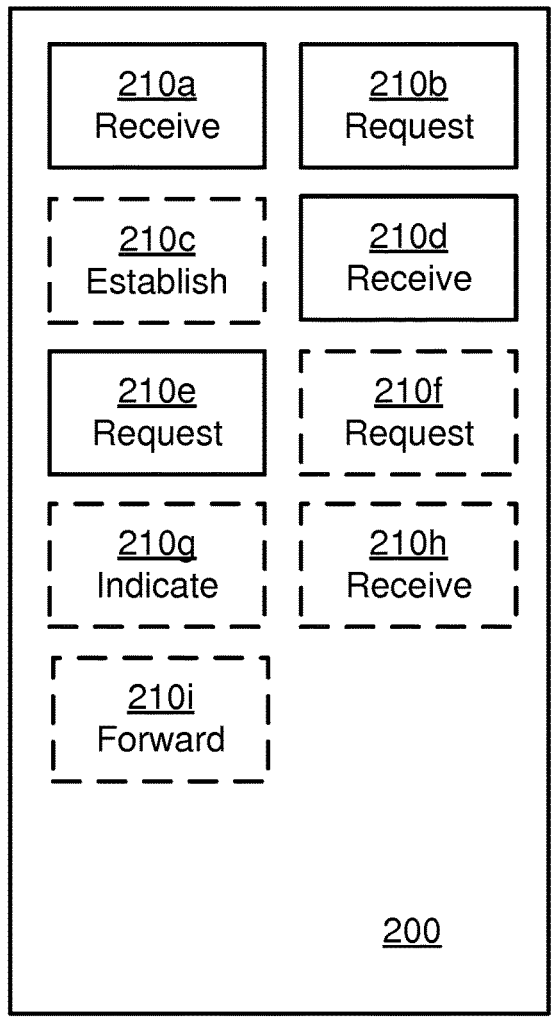
FIG. 8 is a schematic diagram showing functional modules of a server node according to an embodiment.

FIG. 8 schematically illustrates, in terms of a number of functional modules, the components of a server node 200 according to an embodiment. The server node 200 of FIG. 8 comprises a number of functional modules; a receive module 210a configured to perform step S102, a request module 210b configured to perform step S104, a receive module 210d configured to perform step S108, and a request module 210e configured to perform step S110a. The server node 200 of FIG. 8 may further comprise a number of optional functional modules, such as any of an establish module 210c configured to perform step S106; a request module 210f configured to perform step S110b; an indicate module 210g configured to perform step S112; a receive module 210h configured to perform step S114; and a forward module 210i configured to perform step S116. In general terms, each functional module 210a-210i may be implemented in hardware or in software. Preferably, one or more or all functional modules 210a-210i may be implemented by the processing circuitry 210, possibly in cooperation with the communications interface 220 and/or the storage medium 230. The processing circuitry 210 may thus be arranged to from the storage medium 230 fetch instructions as provided by a functional module 210a-210i and to execute these instructions, thereby performing any steps of the server node 200 as disclosed herein.

Figure 9:
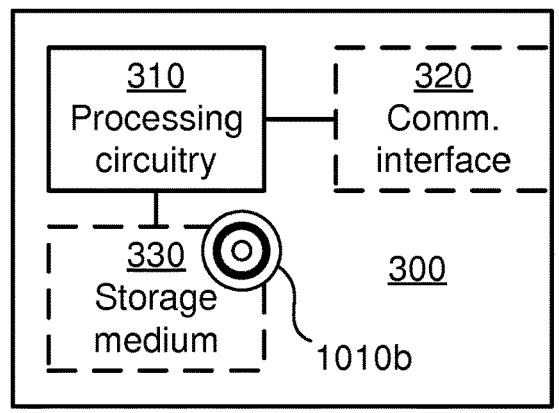
FIG. 9 is a schematic diagram showing functional units of a core network node according to an embodiment.

FIG. 9 schematically illustrates, in terms of a number of functional units, the components of a core network node 300 according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1110b (as in FIG. 11), e.g. in the form of a storage medium 330. The processing circuitry 310 may further be provided as at least one application specific integrated circuit (ASIC), or field programmable gate array (FPGA).

Particularly, the processing circuitry 310 is configured to cause the core network node 300 to perform a set of operations, or steps, S202-S208, as disclosed above. For example, the storage medium 330 may store the set of operations, and the processing circuitry 310 may be configured to retrieve the set of operations from the storage medium 330 to cause the core network node 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The core network node 300 may further comprise a communications interface 320 for communications with other entities, nodes, functions, and devices in the network 100. As such the communications interface 320 may comprise one or more transmitters and receivers, comprising analogue and digital components.

The processing circuitry 310 controls the general operation of the core network node 300 e.g. by sending data and control signals to the communications interface 320 and the storage medium 330, by receiving data and reports from the communications interface 320, and by retrieving data and instructions from the storage medium 330. Other components, as well as the related functionality, of the core network node 300 are omitted in order not to obscure the concepts presented herein.

Figure 10:
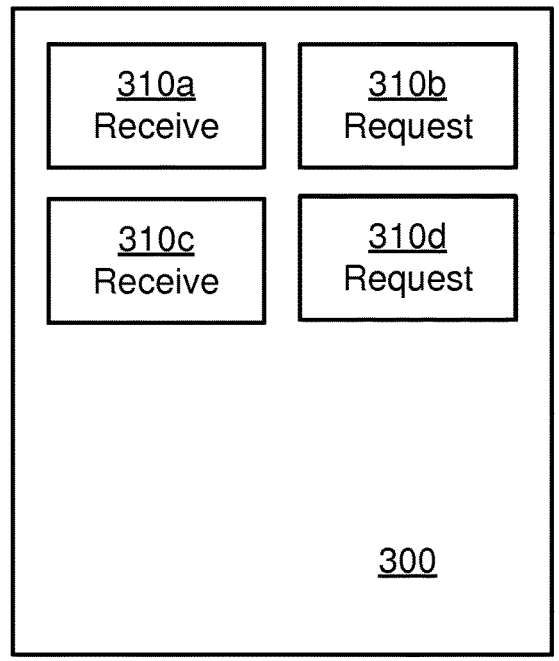
FIG. 10 is a schematic diagram showing functional modules of a core network node according to an embodiment.

FIG. 10 schematically illustrates, in terms of a number of functional modules, the components of a core network node 300 according to an embodiment. The core network node 300 of FIG. 10 comprises a number of functional modules; a receive module 310a configured to perform step S202, a request module 310b configured to perform step S204, a receive module 310c configured to perform step S206, and a request module 310d configured to perform step S208. The core network node 300 of FIG. 10 may further comprise a number of optional functional modules. In general terms, each functional module 310a-310d may be implemented in hardware or in software. Preferably, one or more or all functional modules 310a-310d may be implemented by the processing circuitry 310, possibly in cooperation with the communications interface 320 and/or the storage medium 330. The processing circuitry 310 may thus be arranged to from the storage medium 330 fetch instructions as provided by a functional module 310a-310d and to execute these instructions, thereby performing any steps of the core network node 300 as disclosed herein.

The server node 200 and/or core network node 300 may be provided as separate standalone devices or be a part of at least one further device. For example, the server node 200 may be provided in a node of the service network, and the core network node 300 may be provided in a node of the core network. For example, the server node 200 could be implemented in, co-located with, or part of, a GC server node, an MC service server, and/or an BMSC. For example, the core network node 300 could be implemented in, co-located with, or part of a PCRF node.

Alternatively, functionality of the server node 200 and/or core network node 300 may be distributed between at least two devices, or nodes. These at least two nodes, or devices, may either be part of the same network part or may be spread between at least two such network parts. Thus, a first portion of the instructions performed by the server node 200 and/or core network node 300 may be executed in a first device, and a second portion of the of the instructions performed by the server node 200 and/or core network node 300 may be executed in a second device; the herein disclosed embodiments are not limited to any particular number of devices on which the instructions performed by the server node 200 and/or core network node 300 may be executed. Hence, the methods according to the herein disclosed embodiments are suitable to be performed by a server node 200 and/or core network node 300 residing in a cloud computational environment. Therefore, although a single processing circuitry 210, 310 is illustrated in FIGS. 7 and 9 the processing circuitry 210, 310 may be distributed among a plurality of devices, or nodes. The same applies to the functional modules 210a-210i, 310a-310d of FIGS. 8 and 10 and the computer programs 1120a, 1120b of FIG. 11 (see below).

Figure 11:
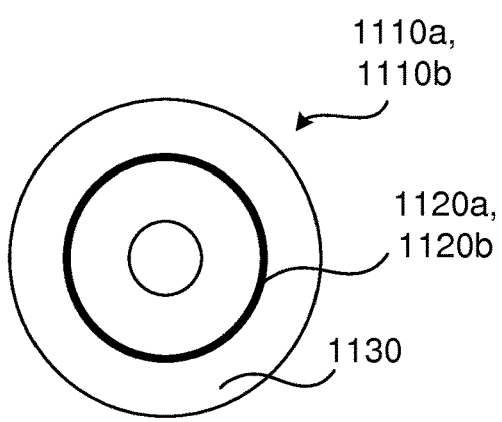
FIG. 11 shows one example of a computer program product comprising computer readable means according to an embodiment.

FIG. 11 shows one example of a computer program product 1110a, 1110b comprising computer readable means 1130. On this computer readable means 1130, a computer program 1120a can be stored, which computer program 1120a can cause the processing circuitry 210 and thereto operatively coupled entities and devices, such as the communications interface 220 and the storage medium 230, to execute methods according to embodiments described herein. The computer program 1120a and/or computer program product 1110a may thus provide means for performing any steps of the server node 200 as herein disclosed. On this computer readable means 1130, a computer program 1120b can be stored, which computer program 1120b can cause the processing circuitry 310 and thereto operatively coupled entities and devices, such as the communications interface 320 and the storage medium 330, to execute methods according to embodiments described herein. The computer program 1120b and/or computer program product 1110b may thus provide means for performing any steps of the core network node 300 as herein disclosed.

In the example of FIG. 11, the computer program product 1110a, 1110b is illustrated as an optical disc, such as a CD (compact disc) or a DVD (digital versatile disc) or a Blu-Ray disc. The computer program product 1110a, 1110b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120a, 1120b is here schematically shown as a track on the depicted optical disk, the computer program 1120a, 1120b can be stored in any way which is suitable for the computer program product 1110a, 1110b.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for resource allocation for Push to Talk (PTT) group communication in a network, the method comprising a server node of a group communication system:
receiving a first request from a client node for the client node to affiliate with a group of client nodes in order for the client node to join a group communication session of the group communication;
requesting, from a Policy and Charging Rules Function (PCRF) node and in response to the first request, a first allocation of network resources to be used by the client node for floor control of the group communication session;
receiving a second request for a group call from the client node; and
requesting, from the PCRF node and upon reception of the second request, a second allocation of network resources to be used by the client node for media transmission in the group call.

2. The method of claim 1, wherein the network resources to be used by the client node for transmission control of the group communication session and the network resources to be used by the client node for media transmission in the group call are to be used in one and the same Session Initiation Protocol (SIP) session or Session Announcement Protocol (SAP) session.

3. The method of claim 2, wherein the SIP session or SAP session is ongoing when the first request is received, and wherein the first request causes the client node to affiliate to the group of client nodes in the SIP session or SAP session.

4. The method of claim 1, wherein the requesting the first allocation comprised transmitting a message indicating media type as control to the core network node.

5. The method of claim 1, further comprising establishing the group communication session with the client node when having requested the first allocation but before having requested the second allocation, thereby enabling the client node to join the group communication session.

6. The method of claim 1, wherein the second request is transmitted by the client node using network resources according to the first allocation.

7. The method of claim 1, wherein the second request comprises a request for the client node to transmit media in the group call.

8. The method of claim 1, wherein the requesting the second allocation comprises transmitting a message indicating media type as audio and/or video to the core network node.

9. The method of claim 1, further comprising requesting, from the core network node and upon reception of the second request, a respective second allocation of network resources to be used by each client node in the group of client nodes for media transmission in the group call.

10. The method of claim 9:
    wherein the media transmission in downlink is using Multicast-Broadcast Multimedia Services (MBMS) bearers; and
    wherein only uplink network resources to be used by each client node are requested.

11. The method of claim 1, further comprising indicating, to all client nodes, start of the group call when having requested the second allocation.

12. The method of claim 11, wherein the media transmission is transmitted by the client node using network resources according to the second allocation.

13. The method of claim 1, further comprising:
    receiving media transmission for the group call from the client node; and
    forwarding media of the media transmission to other client nodes in the group of client nodes.

14. A method for resource allocation for Push to Talk (PTT) group communication in a network, the method comprising a Policy and Charging Rules Function (PCRF):
    receiving, from a server node of a group communication system, a first request for first network resources to be used by a client node of a group communication session of the group communication system for floor control of the group communication session;
    requesting a radio access network of the client node to make the first network resources available to the client node;
    receiving, from the server node, a second request for second network resources to be used by the client node for media transmission in the group call; and
    requesting the radio access network of the client node to make the second network resources available to the client node;
    wherein the first request and the second request are received during one and the same Session Initiation Protocol (SIP) session or Session Announcement Protocol (SAP) session.

15. The method of claim 14, wherein the first request for network resources comprises a message indicating media type as control.

16. The method of claim 14, wherein the second request for network resources comprises a message indicating media type as audio and/or video.

17. A server node of a group communication system for resource allocation for Push to Talk (PTT) group communication in a network, the server node comprising:
    processing circuitry; and
    memory containing instructions executable by the processing circuitry whereby the server node is operative to:
        receive a first request from a client node for the client node to affiliate with a group of client nodes in order for the client node to join a group communication session of the group communication system;
        request, from a Policy and Charging Rules Function (PCRF) node and in response to the first request, a first allocation of network resources to be used by the client node for floor control of the group communication session;
        receive a second request for a group call from the client node; and
        request, from the PCRF node and upon reception of the second request, a second allocation of network resources to be used by the client node for media transmission in the group call.

18. A Policy and Charging Rules Function (PCRF) node for resource allocation for Push to Talk (PTT) group communication in a network, the core network node comprising:
    processing circuitry; and
    memory containing instructions executable by the processing circuitry whereby the PCRF node is operative to:
        receive, from a server node of a group communication system, a first request for first network resources to be used by a client node of a group communication session of the group communication system for floor control of the group communication session;
        request a radio access network of the client node to make the first network resources available to the client node;
        receive, from the server node, a second request for second network resources to be used by the client node for media transmission in the group call; and
        request the radio access network of the client node to make the second network resources available to the client node;
        wherein the first request and the second request are received during one and the same Session Initiation Protocol (SIP) session or Session Announcement Protocol (SAP) session.

* * * * *

UNITED STATES PATENT AND TRADEMARK OFFICE
CERTIFICATE OF CORRECTION

PATENT NO. : 11,039,500 B2
APPLICATION NO. : 16/615428
DATED : June 15, 2021
INVENTOR(S) : Tränk et al.

Page 1 of 1

It is certified that error appears in the above-identified patent and that said Letters Patent is hereby corrected as shown below:

In the Specification

In Column 5, Line 11, delete "eight," and insert -- eighth, --, therefor.

In Column 5, Line 15, delete "eight," and insert -- eighth, --, therefor.

In Column 11, Line 29, delete "vide," and insert -- video, --, therefor.

In Column 12, Line 64, delete "than" and insert -- then --, therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*